United States Patent
Fruchter et al.

(10) Patent No.: US 10,559,276 B2
(45) Date of Patent: Feb. 11, 2020

(54) APPARATUS, SYSTEM, AND METHOD FOR MITIGATING MOTION-TO-PHOTON LATENCY IN HEAD-MOUNTED DISPLAYS

(71) Applicant: Oculus VR, LLC, Menlo Park, CA (US)

(72) Inventors: Vlad Fruchter, Los Altos, CA (US); Ohad Meitav, Sunnyvale, CA (US); David Vakrat, Sunnyvale, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/006,434

(22) Filed: Jun. 12, 2018

(65) Prior Publication Data

US 2019/0244582 A1    Aug. 8, 2019

Related U.S. Application Data

(60) Provisional application No. 62/626,004, filed on Feb. 3, 2018.

(51) Int. Cl.
    *G09G 5/00* (2006.01)
    *G06T 19/00* (2011.01)
    (Continued)

(52) U.S. Cl.
    CPC .......... *G09G 5/006* (2013.01); *G06F 3/012* (2013.01); *G06T 15/503* (2013.01);
    (Continued)

(58) Field of Classification Search
    None
    See application file for complete search history.

(56) References Cited

U.S. PATENT DOCUMENTS 7,312,766 B1   12/2007   Edwards
7,804,507 B2   9/2010    Yang et al.
(Continued)

FOREIGN PATENT DOCUMENTS

FR    2 840 753 A1       12/2003
KR    10-2008-0010502 A   1/2008
(Continued)

OTHER PUBLICATIONS

International Search Report and Written Opinion received for PCT Application Serial No. PCT/US18/036975 dated Feb. 20, 2019, 12 pages.
(Continued)

*Primary Examiner* — Frank S Chen
(74) *Attorney, Agent, or Firm* — FisherBroyles, LLP

(57) ABSTRACT

A special-purpose hardware device for mitigating motion-to-photon latency in head-mounted displays may include an image signal processor that receives at least one image frame captured by a camera device of a head-mounted-display system. The special-purpose hardware device may also include an input-formatting component that receives the computer-generated imagery. The special-purpose hardware device may further include a blending component that generates at least one mixed-reality frame by overlaying the computer-generated imagery onto the image frame. The special-purpose hardware device may additionally include a frame-output interface that feeds the mixed-reality frame generated by the blending component to a display device of the head-mounted-display system to facilitate displaying the mixed-reality frame for presentation to a user wearing the head-mounted-display system. Various other apparatuses, systems, and methods are also disclosed.

19 Claims, 10 Drawing Sheets

(51) Int. Cl.
  G09G 5/12 (2006.01)
  G06F 3/01 (2006.01)
  G06T 15/50 (2011.01)
  G09G 5/36 (2006.01)
(52) U.S. Cl.
  CPC .............. *G06T 19/006* (2013.01); *G09G 5/12* (2013.01); *G09G 5/363* (2013.01); *G09G 2310/08* (2013.01); *G09G 2320/0233* (2013.01); *G09G 2320/0252* (2013.01); *G09G 2320/0276* (2013.01); *G09G 2320/0666* (2013.01); *G09G 2340/0464* (2013.01); *G09G 2354/00* (2013.01)

(56) References Cited

U.S. PATENT DOCUMENTS

| | | | |
|---|---|---|---|
| 8,327,071 | B1 | 12/2012 | Danskin et al. |
| 8,417,031 | B2 | 4/2013 | Kasahara |
| 9,633,479 | B2 | 4/2017 | Grasso et al. |
| 9,858,637 | B1 | 1/2018 | Quach et al. |
| 9,984,499 | B1 | 5/2018 | Jurgenson et al. |
| 10,152,775 | B1 * | 12/2018 | Bellows .............. G02B 27/0172 |
| 2008/0024597 | A1 | 1/2008 | Yang et al. |
| 2009/0226086 | A1 | 9/2009 | Kasahara |
| 2010/0207957 | A1 | 8/2010 | Taneja et al. |
| 2013/0201291 | A1 | 8/2013 | Liu et al. |
| 2015/0029218 | A1 | 1/2015 | Williams et al. |
| 2015/0206353 | A1 | 7/2015 | Grasso et al. |
| 2016/0035139 | A1 * | 2/2016 | Fuchs .................. G02B 27/017 345/633 |
| 2016/0037085 | A1 | 2/2016 | Mills et al. |
| 2016/0203642 | A1 | 7/2016 | Thomas |
| 2016/0238852 | A1 | 8/2016 | Ellsworth et al. |
| 2016/0314564 | A1 | 10/2016 | Jones et al. |
| 2016/0328882 | A1 | 11/2016 | Lee et al. |
| 2016/0364904 | A1 * | 12/2016 | Parker ...................... G06F 3/012 |
| 2017/0200308 | A1 | 7/2017 | Nguyen et al. |
| 2017/0243324 | A1 | 8/2017 | Mierle et al. |
| 2017/0336863 | A1 | 11/2017 | Tilton et al. |
| 2017/0345220 | A1 | 11/2017 | Bates |
| 2018/0012416 | A1 | 1/2018 | Jones et al. |
| 2018/0081429 | A1 | 3/2018 | Akenine-Moller et al. |
| 2018/0082482 | A1 | 3/2018 | Motta et al. |
| 2018/0136465 | A1 | 5/2018 | Chi et al. |
| 2018/0143442 | A1 * | 5/2018 | Gupta .................. A61M 11/042 |
| 2018/0146189 | A1 | 5/2018 | Park |
| 2018/0211638 | A1 | 7/2018 | Ozguner et al. |
| 2018/0249151 | A1 | 8/2018 | Freeman et al. |
| 2018/0286105 | A1 * | 10/2018 | Surti .................... G02B 27/017 |

FOREIGN PATENT DOCUMENTS

| | | |
|---|---|---|
| KR | 10-2016-0139461 A | 12/2016 |
| WO | 2016/190489 A1 | 12/2016 |
| WO | 2017/139871 A1 | 8/2017 |

OTHER PUBLICATIONS

Extended European Search Report received for EP Patent Application Serial No. 18188235.8 dated Mar. 19, 2019, 18 pages.

Waveren, J.M.P. van., "The Asynchronous Time Warp for Virtual Reality on Consumer Hardware", Proceedings of the 22nd ACM Conference on Virtual Reality Software and Technology, VRST '16, 2016, pp. 37-46.

International Search Report and Written Opinion received for International Patent Application Serial No. PCT/US2018/038224 dated Dec. 21, 2018, 16 pages.

International Search Report and Written Opinion received for International Patent Application Serial No. PCT/US2018/038230 dated Nov. 1, 2018, 16 pages.

"Clock Domain Crossing", Virginia Polytechnic Institute and State University, URL: https://filebox.ece.vt.edu/~athanas/4514/ledadoc/html/pol_cdc_html, May 11, 2015, 24 pages.

Epipolar Geometry; https://en.wikipedia.org/wiki/Epipolar_geometry.

Inside-out v. Outside-in; https://www.wareable.com/vr/inside-out-vs-outside-in-vr-tracking-343.

Kanade-Lucas-Tomasi Feature Tracker; https://en.wikipedia.org/wiki/Kanade%E2%80%93Lucas%E2%80%93Tomasi_feature_tracker.

Orb; https://en.wikipedia.org/wiki/Oriented_FAST_and_rotated_BRIEF.

Positional Tracking; https://en.wikipedia.org/wiki/Positional_tracking.

Vlad Fruchter, et al.; Apparatus, System, and Method for Mitigating Motion-To-Photon Latency in Head-Mounted Displays; U.S. Appl. No. 62/626,004, filed Feb. 3, 2018.

Vlad Fruchter, et al.; Apparatus, System, and Method for Mitigating Motion-To-Photon Latency in Head-Mounted Displays; U.S. Appl. No. 16/006,438, filed Jun. 12, 2018.

David Vakrat, et al.; Apparatus, System, and Method for Accelerating Positional Tracking of Head-Mounted Displays; U.S. Appl. No. 15/985,733, filed May 22, 2018.

Partial European Search Report received for EP Patent Application Serial No. 18207788.3 dated Jun. 13, 2019, 16 pages.

Wikipedia, "CPU cache", URL: https://en.wikipedia.org/wiki/CPU_cache, Apr. 22, 2018, 23 pages.

Partial European Search Report received for EP Patent Application Serial No. 18187455.3 dated Mar. 26, 2019, 20 pages.

U.S. Provisional Appl. No. 62/489,801 filed on Apr. 25, 2017, 69 pages.

Extended European Search Report received for EP Patent Application Serial No. 18207788.3 dated Nov. 12, 2019, 15 pages.

Jiang et al., "Camera Tracking for Augmented Reality Media", IEEE International Conference on Multimedia and Expo, Proceedings, Latest Advances in the Fast Changing World of Multimedia (Cat. No. 00TH8532), vol. 3, Jul. 30, 2000, pp. 1637-1640.

* cited by examiner

APPARATUS, SYSTEM, AND METHOD FOR MITIGATING MOTION-TO-PHOTON LATENCY IN HEAD-MOUNTED DISPLAYS

CROSS REFERENCE TO RELATED APPLICATION

This application claims the benefit of U.S. Provisional Application No. 62/626,004 filed Feb. 3, 2018, the disclosure of which is incorporated in its entirety, by this reference.

BACKGROUND

Over the last several years, head-mounted displays have revolutionized the way people experience various kinds of digital media. For example, head-mounted displays may allow virtual-reality users to experience realistic, immersive virtual environments while playing video games, during flight simulation training, or even when interacting with co-workers around the globe. In addition to such virtual-reality applications, head-mounted displays may also enable users to augment reality and/or combine certain aspects of reality with those of the virtual world.

Despite incredible advances in such technology, traditional head-mounted displays may still have certain deficiencies that negatively impact the overall user experience. For example, some head-mounted displays may be unable to accurately compensate and/or account for physical movements made by the user. More specifically, these head-mounted displays may exhibit a certain amount of delay that causes the display to lag behind the user's actual physical movements. This delay is sometimes referred to as motion-to-photon latency. Unfortunately, beyond just being a nuisance to the user's overall experience, motion-to-photon latency may, in some cases, cause the user to become ill and/or nauseated.

The instant disclosure, therefore, identifies and addresses a need for additional apparatuses, systems, and methods for mitigating motion-to-photon latency in head-mounted displays.

SUMMARY

As will be described in greater detail below, the instant disclosure generally relates to apparatuses, systems, and methods for mitigating motion-to-photon latency in head-mounted displays. In some embodiments, a special-purpose hardware device may achieve this goal. For example, a special-purpose hardware device may include an image signal processor that receives at least one image frame captured by a camera device of a head-mounted-display system. The special-purpose hardware device may also include an input-formatting component that receives computer-generated imagery intended to be blended with the image frame. The special-purpose hardware device may further include a blending component that generates at least one mixed-reality frame by overlaying the computer-generated imagery onto the image frame received from the camera device of the head-mounted-display system. In addition, the special-purpose hardware device may include a frame-output interface that feeds the mixed-reality frame generated by the blending component to a display device of the head-mounted-display system to facilitate displaying the mixed-reality frame for presentation to a user wearing the head-mounted-display system.

In some examples, the special-purpose hardware device may include one or more hardware-accelerated image-correction components that each perform at least one image-correction procedure on the mixed-reality frame to prepare the mixed-reality frame for the display device. For example, the special-purpose hardware device may include a hardware-accelerated component that at least partially corrects a chromatic aberration in the mixed-reality frame as the mixed-reality frame traverses toward the display device. The special-purpose hardware device may also include a hardware-accelerated component that performs gamma correction on the mixed-reality frame as the mixed-reality frame traverses toward the display device. The special-purpose hardware device may further include a hardware-accelerated component that performs non-uniformity correction on the mixed-reality frame as the mixed-reality frame traverses toward the display device.

Additionally or alternatively, the special-purpose hardware device may include a hardware-accelerated component that modifies the mixed-reality frame to account for an overdrive feature of the display device as the mixed-reality frame traverses toward the display device. The special-purpose hardware device may also include a hardware-accelerated device that at least partially corrects a Mura phenomenon in the mixed-reality frame as the mixed-reality frame traverses toward the display device. The special-purpose hardware device may further include a hardware-accelerated device that performs dithering on the mixed-reality frame as the mixed-reality frame traverses toward the display device.

In some examples, the special-purpose hardware device may include a direct communication path between the image signal processor and the blending component that enables the image frame to be fed directly to the blending component without being buffered in memory. In one example, the special-purpose hardware device may include one or more hardware-accelerated distortion components that apply asynchronous time warping and/or asynchronous space warping to the image frame and/or the computer-generated imagery. In this example, one hardware-accelerated distortion component may distort image frame to align certain pixels of the image frame to corresponding pixels of the computer-generated imagery and then map the certain pixels of the image frame to a specific element of the display device, and another hardware-accelerated distortion component may distort the computer-generated imagery to align the corresponding pixels of the computer-generated imagery to the certain pixels of the image frame and then map the corresponding pixels of the computer-generated imagery to the specific element of the display device.

In some examples, the image signal processor may forward the image frame directly to a processing component within the special-purpose hardware device without temporarily buffering the image frame in memory. In such examples, the image signal processor may mitigate motion-to-photon latency of the head-mounted-display system by avoiding accessing memory in connection with the image frame. In one example, the processing component may include and/or represent the blending component. In another example, the processing component may include and/or represent a hardware-accelerated distortion component that applies asynchronous time warping to the image frame.

A corresponding head-mounted-display system may include at least one camera device that captures one or more image frames from a perspective of a user wearing the head-mounted-display system. The head-mounted-display system may further include a special-purpose hardware device communicatively coupled to the camera device. The special-purpose hardware device may receive the image frames from the camera device and computer-generated imagery intended to be blended with the image frames. The special-purpose hardware device may then generate one or more mixed-reality frames by overlaying the computer-generated imagery onto the image frames received from the camera device. In addition, the head-mounted-display system may include a display device communicatively coupled to the special-purpose hardware device. The display device may receive the mixed-reality frames from the special-purpose hardware device and then display the mixed-reality frames for presentation to the user wearing the head-mounted-display system.

In some examples, the head-mounted-display system may include a clock generator that generates a clock signal. In such examples, the special-purpose hardware device and the display device may be synchronized with respect to one another based at least in part on the clock signal generated by the clock generator.

In some examples, the special-purpose hardware device may perform one or more hardware-accelerated intraframe processing operations on the image frames on a line-by-line basis. In one example, the head-mounted-display system may include a motion-detection sensor that detects movements made by the user wearing the head-mounted-display system. In this example, the special-purpose hardware device may receive, from the motion-detection sensor, user-motion data indicating that the user wearing the head-mounted-display system has made at least one movement since a certain image frame was captured by the camera device. The special-purpose hardware device may also identify a subset of lines from the certain image frame that have yet to be forwarded toward the display device even though an additional subset of lines from the certain image frame have already been forwarded toward the display device. Upon identifying the subset of lines, the special-purpose hardware device may modify the subset of lines based at least in part on the user-motion data from the motion-detection sensor to compensate for the movement made by the user. The special-purpose hardware device may then forward the subset of modified lines from the certain image frame toward the display device to facilitate displaying, for presentation to the user, the subset of modified lines together with the additional subset of lines.

In this example, the additional subset of lines may have not been modified to compensate for the movement made by the user. The display device may simultaneously display, during at least one point in time, the subset of modified lines and the additional subset of lines for presentation to the user.

A corresponding method may include (a) receiving, by a special-purpose hardware device, at least one image frame captured by a camera device of a head-mounted-display system, (b) receiving, by the special-purpose hardware device, computer-generated imagery intended to be blended with the image frame, (c) generating, by the special-purpose hardware device, at least one mixed-reality frame by overlaying the computer-generated imagery received from the independent host device onto the image frame received from the camera device of the head-mounted-display system, and then (d) feeding, by the special-purpose hardware device, the mixed-reality frame generated by the blending component to a display device of the head-mounted-display system such that the display device displays the mixed-reality frame for presentation to a user wearing the head-mounted-display system.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures and description.

Figure 1:
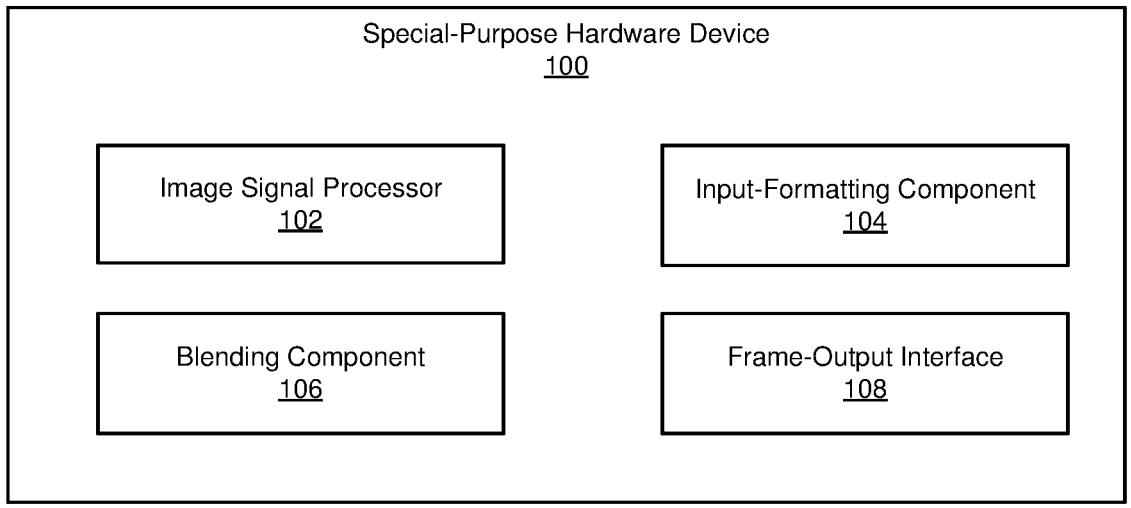
FIG. 1 is a block diagram of an exemplary special-purpose hardware device for mitigating motion-to-photon latency in head-mounted displays in accordance with some embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to apparatuses, systems, and methods for mitigating motion-to-photon latency in head-mounted displays. As will be explained in greater detail below, the apparatuses, systems, and methods disclosed herein may reduce the number of Dynamic Random Access Memory (DRAM) accesses involved in image frame processing cycles. By doing so, these apparatuses, systems, and methods may decrease the amount of time needed to complete such image frame processing cycles, thus mitigating motion-to-photon latency and potentially improving the overall experience of users wearing head-mounted displays.

Additionally or alternatively, these apparatuses, systems, and methods may implement a hardware-accelerated display imaging pipeline capable of being synchronized with the corresponding display device via a common clock signal. This synchronization via the common clock signal may eliminate the need to perform time-consuming synchronization operations between image-delivery devices (in this example, the hardware-accelerated display imaging pipeline) and display devices. By doing so, these apparatuses, systems, and methods may decrease resource consumption and/or time delays or penalties in head-mounted displays, thus further mitigating motion-to-photon latency and potentially improving the overall experience of users wearing head-mounted displays.

Moreover, this synchronization via the common clock signal may enable the hardware-accelerated display imaging pipeline to perform image processing operations in-line. By doing so, the hardware-accelerated display imaging pipeline may be able to perform image processing operations on a line-by-line basis, as opposed to a frame-by-frame basis. As a result, the hardware-accelerated display imaging pipeline may compensate and/or account for user movements much faster (via, e.g., intraframe modifications) than traditional image-delivery devices. By doing so, the hardware-accelerated display imaging pipeline may reduce and/or improve the response time of such head-mounted displays, thus mitigating motion-to-photon latency and potentially improving the overall experience of users wearing head-mounted displays.

Reference will now be made to various exemplary embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known systems, methods, procedures, components, circuits, and networks have not been described in detail so as not to unnecessarily obscure aspects of the embodiments.

The following will provide, with reference to FIGS. 1-11, detailed descriptions of exemplary apparatuses, systems, and/or corresponding implementations for mitigating motion-to-photon latency in head-mounted displays. Detailed descriptions of methods for mitigating motion-to-photon latency in head-mounted displays will be provided in connection with FIG. 12.

FIG. 1 illustrates an exemplary special-purpose hardware device 100 for mitigating motion-to-photon latency in accordance with some embodiments. In certain examples, special-purpose hardware device 100 may be incorporated in and/or represent part of a head-mounted display. In such examples, special-purpose hardware device 100 may be responsible for performing certain image processing operations on images that are ultimately displayed to a user wearing the head-mounted display.

Special-purpose hardware device 100 generally represents a physical circuit, system, and/or hardware accelerator designed to perform various time-sensitive image processing operations. In some examples, special-purpose hardware device 100 may include and/or represent a System on a Chip (SoC) and/or an Application-Specific Integrated Circuit (ASIC). For example, special-purpose hardware device 100 may implement a display imaging pipeline by way of an SoC and/or an ASIC. In addition to the display imaging pipeline, the SoC and/or ASIC may also include a variety of other computing components involved in processing images for display by the head-mounted display. Examples of such computing components include, without limitation, Advanced Reduced Instruction Set Computer (RISC) Machine (ARM) processors, Central Processing Units (CPUs), Image Signal Processors (ISPs), Digital Signal Processors (DSPs), Computer Vision (CV) accelerators, video encoders, video decoders, hardware-accelerated processing components, combinations or variations of one or more of the same, and/or any other suitable components.

As illustrated in FIG. 1, special-purpose hardware device 100 may include an image signal processor 102, an input-formatting component 104, a blending component 106, and a frame-output interface 108. In some examples, image signal processor 102 may receive image frames from cameras onboard the head-mounted display and/or perform certain image processing operations (such as image scaling, lens correction, noise correction, contrasting, sharpening, etc.) on those image frames.

In some examples, input-formatting component 104 may receive computer-generated imagery from an independent host device that is external to the head-mounted-display system and/or decompress or decode such computer-generated imagery for overlaying onto the image frames captured by the onboard cameras. Additionally or alternatively, input-formatting component 104 may receive computer-generated imagery from an internal source device onboard the head-mounted display. Input-formatting component 104 may also perform certain image processing and/or formatting operations (such as decompression, decoding, extraction, scaling, edge preservation, etc.) on the computer-generated imagery received from the independent host device.

In some examples, blending component 106 may generate mixed-reality frames by overlaying the computer-generated imagery received from the independent host device onto the image frames captured by the onboard cameras. In other words, blending component 106 may effectively blend certain elements of the real world captured in the image frames with other elements of the virtual world represented in the computer-generated imagery. The term "mixed-reality frame" may, in some examples, refer to any type or form of image frame that includes and/or combines one or more elements of photographic content and/or imagery with one or more elements of computer-generated imagery.

In some examples, frame-output interface 108 may send, transmit, and/or feed the mixed-reality frames to a display device integrated and/or incorporated into the head-mounted display. By doing so, frame-output interface 108 may enable the display device to display the mixed-reality frames for presentation to the user wearing the head-mounted display. In one example, frame-output interface 108 may include and/or represent a Mobile Industry Processor Interface (MIPI) Display Serial Interface (DSI).

Figure 2:
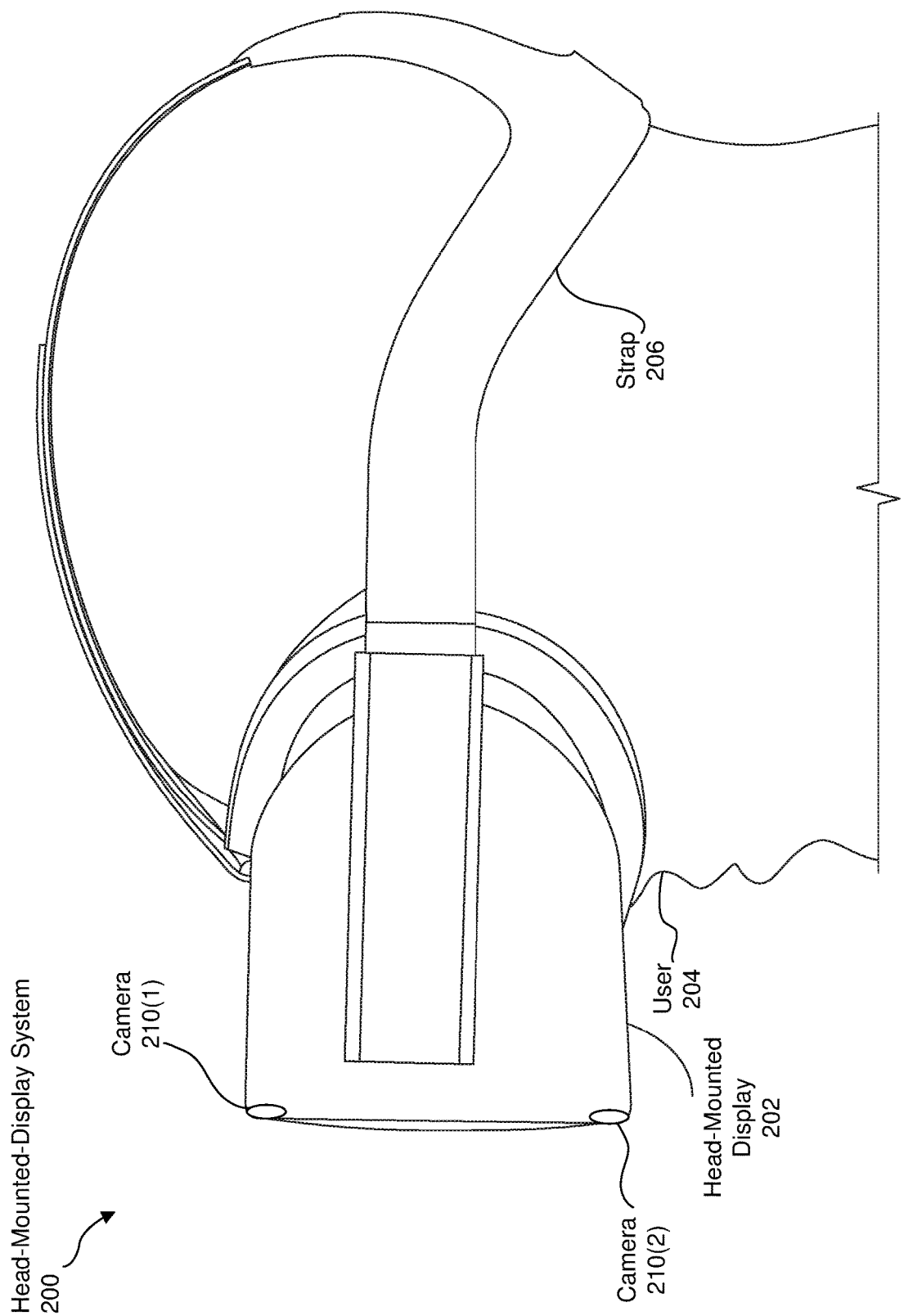
FIG. 2 is an illustration of an exemplary head-mounted-display system that incorporates a special-purpose hardware device for mitigating motion-to-photon latency in head-mounted displays in accordance with some embodiments.

FIG. 2 illustrates an exemplary head-mounted-display system 200 worn by a user 204 in accordance with some embodiments. As illustrated in FIG. 2, head-mounted-display system 200 may include strap 206 coupled to a head-mounted display 202. In this example, head-mounted display 202 may include at least cameras 210(1) and 210(2) that capture images and/or video of the surroundings of user 204. Thus, cameras 210(1) and 210(2) may facilitate see-through functionality and/or image or enable head-mounted display 202 to serve as a mixed-reality portal in which the real-world surroundings of user 204 are blended with virtual-world content. Examples of cameras 210(1) and 210(2) include, without limitation, digital photographic cameras, RGB cameras, Complementary Metal Oxide Semiconductor (CMOS) image sensors, Charge Coupled Device (CCD) image sensors, imaging sensor arrays, variations or combinations of one or more of the same, combinations of one or more of the same, and/or any other suitable cameras.

The term "head-mounted display" may, in some examples, refer to any type or form of display device or system that is worn on or about a user's face and displays visual content to the user. Head-mounted displays may display content in any suitable way, including via a screen (e.g., an LCD or LED screen), a projector, a cathode ray tube, an optical mixer, etc. Head-mounted displays may display content in one or more media formats. For example, head-mounted display 202 may display video, photos, computer-generated imagery (CGI), and/or combinations of the same.

Head-mounted displays may provide diverse and distinctive user experiences. Some head-mounted displays may provide virtual-reality experiences (i.e., they may display computer-generated or pre-recorded content), while other head-mounted displays may provide real-world experiences (i.e., they may display live imagery from the physical world). Head-mounted displays may also provide any mixture of live and virtual content. For example, virtual content may be projected onto the physical world (e.g., via optical or video see-through), which may result in augmented-reality or mixed-reality experiences.

Head-mounted displays may be configured to be mounted to a user's head in a number of ways. Some head-mounted displays may be incorporated into glasses or visors. Other head-mounted displays may be incorporated into helmets, hats, or other headwear.

As illustrated in FIG. 2, user 204 may place head-mounted-display system 200 on the user's head such that head-mounted display 202 is positioned and/or rests on the user's face. By placing head-mounted-display system 200 on his or her face in this way, user 204 may situate head-mounted display 202 over his or her eyes to experience and/or view virtual content presented on head-mounted display 202. User 204 may also secure head-mounted display 202 in the correct position by wrapping strap 206 around the back of the user's head.

Figure 3:
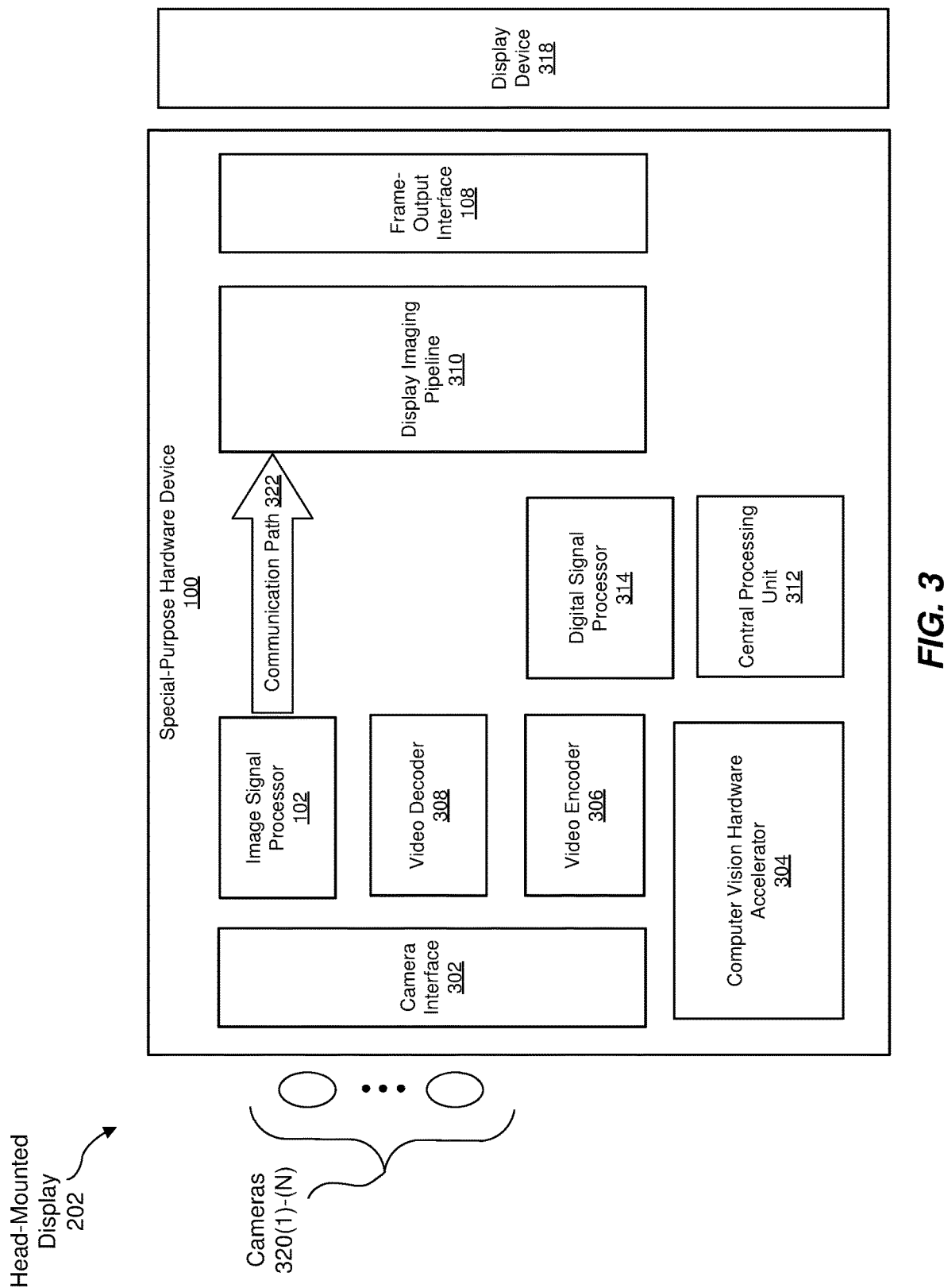
FIG. 3 is a block diagram of an exemplary head-mounted display that incorporates a special-purpose hardware device for mitigating motion-to-photon latency in head-mounted displays in accordance with some embodiments.

FIG. 3 illustrates exemplary components that may be incorporated into head-mounted display 202 for mitigating motion-to-photon latency in accordance with some embodiments. As illustrated in FIG. 3, head-mounted display 202 may include special-purpose hardware device 100, cameras 320(1)-(N), and a display device 318. In some examples, display device 318 may include a screen that renders image frames (such as virtual-reality, augmented-reality, and/or mixed-reality frames) for presentation to the user wearing head-mounted display 202. Examples of display device 318 include, without limitation, Liquid Crystal Displays (LCDs), Light Emitting Diode (LED) displays, retinal projection displays, variations or combinations of one or more of the same, and/or any other suitable display device.

As illustrated in FIG. 3, special-purpose hardware device 100 may include various components and/or hardware-accelerated devices. For example, special-purpose hardware device 100 may include image signal processor 102, a camera interface 302, a computer vision hardware accelerator 304, a video encoder 306, a video decoder 308, a central processing unit 312, a digital signal processor 314, a display imaging pipeline 310, and frame-output interface 316. As will be described in greater detail below, display imaging pipeline 310 may include various hardware-accelerated image-correction components responsible for performing time-sensitive image processing operations.

In some examples, image signal processor 102 may be integrated and/or incorporated internal or external to display imaging pipeline 310 within special-purpose hardware device 100. For example, as illustrated in FIG. 3, image signal processor 102 may be located external to display imaging pipeline 310 within special-purpose hardware device 100. In this example, special-purpose hardware device 100 may include a direct communication path 322 that facilitates communication from image signal processor 102 to display imaging pipeline 310. Direct communication path 322 may enable special-purpose hardware device 100 to minimize the number of memory accesses that are needed throughout the image frame processing cycle to prepare the image frames for presentation by display device 318.

For example, direct communication path 322 may enable image signal processor 102 to forward image frames directly to the subsequent component (e.g., the blending component, a hardware-accelerated distortion component, or a multiplexer) in display imaging pipeline 310 without first being buffered in DRAM. Thus, direct communication path 322 may effectively eliminate the need to buffer the image frames in DRAM between image signal processor 102 and the subsequent component. By doing so, direct communication path 322 may reduce the number of DRAM accesses involved in the image frame processing cycle.

In some examples, display imaging pipeline 310 may be designed specifically for performing time-sensitive image processing operations (such as chromatic aberration correction, gamma correction and/or adjustment, multi-image blending and/or overlaying, display overdrive compensation, Mura correction, dithering, image decompression, image scaling, lens correction, noise correction, image distortion, asynchronous time warping, asynchronous space warping, etc.). Some of these operations may have traditionally been performed by Graphics Processing Units (GPUs), as opposed to SoCs and/or ASICs. However, GPUs are not specifically designed to perform such operations in virtual-reality, augmented-reality, and/or mixed-reality contexts, which may result in GPUs performing essentially like general-purpose devices in such contexts. For example, GPUs may incorporate and/or implement certain features and/or functionalities that slow down such operations, thereby potentially causing and/or contributing to motion-to-photon latency when the GPUs are deployed in virtual-reality, augmented-reality, and/or mixed-reality contexts.

As a specific example of this deficiency, a traditional head-mounted display may include a GPU that is programmed to perform various time-sensitive image processing operations, including chromatic aberration correction, gamma correction and/or adjustment, multi-image blending and/or overlaying, display overdrive compensation, Mura correction, dithering, image scaling, lens correction, noise correction, contrasting, and/or sharpening, among other things. This GPU may be designed such that, after completing one of these operations on an image frame, the GPU temporarily stores and/or buffers the image frame in DRAM until the next operation. At the appropriate time, the GPU may then fetch the image frame from DRAM to perform the next operation on the image frame. This cycle of writing the image frame to DRAM and later reading the image frame from DRAM may continue until each image processing operation has completed.

By the time the image frame is ready for display, the image frame may have undergone numerous DRAM read and/or write operations. Unfortunately, each DRAM access (whether a read or write) may result in and/or amount to a delay or time penalty for the image frame. Thus, in this GPU-driven embodiment, the amount of time needed to complete all the image processing operations on the image frame may be prolonged and/or drawn out due at least in part to the general-purpose architecture of the GPU and/or its heavy reliance on the DRAM buffer.

In some applications (such as GPU-driven televisions or computer monitors), such delays may have little, if any, effect on the overall user experience. In fact, such delays may be entirely unnoticeable. However, in virtual-reality, augmented-reality, and/or mixed-reality contexts, such delays may be noticeable or even obvious to some users, potentially leading to a disjointed user experience that could leave them feeling ill.

To address this deficiency, head-mounted display 202 may include and/or incorporate special-purpose hardware device 100 (e.g., an SoC and/or ASIC), which performs many of the image processing operations that were traditionally the responsibility of GPUs. As will be explained in greater detail below, SoC- and/or ASIC-driven display pipelines may outperform and/or improve upon traditional GPU-driven display pipelines for various reasons.

Figure 4:
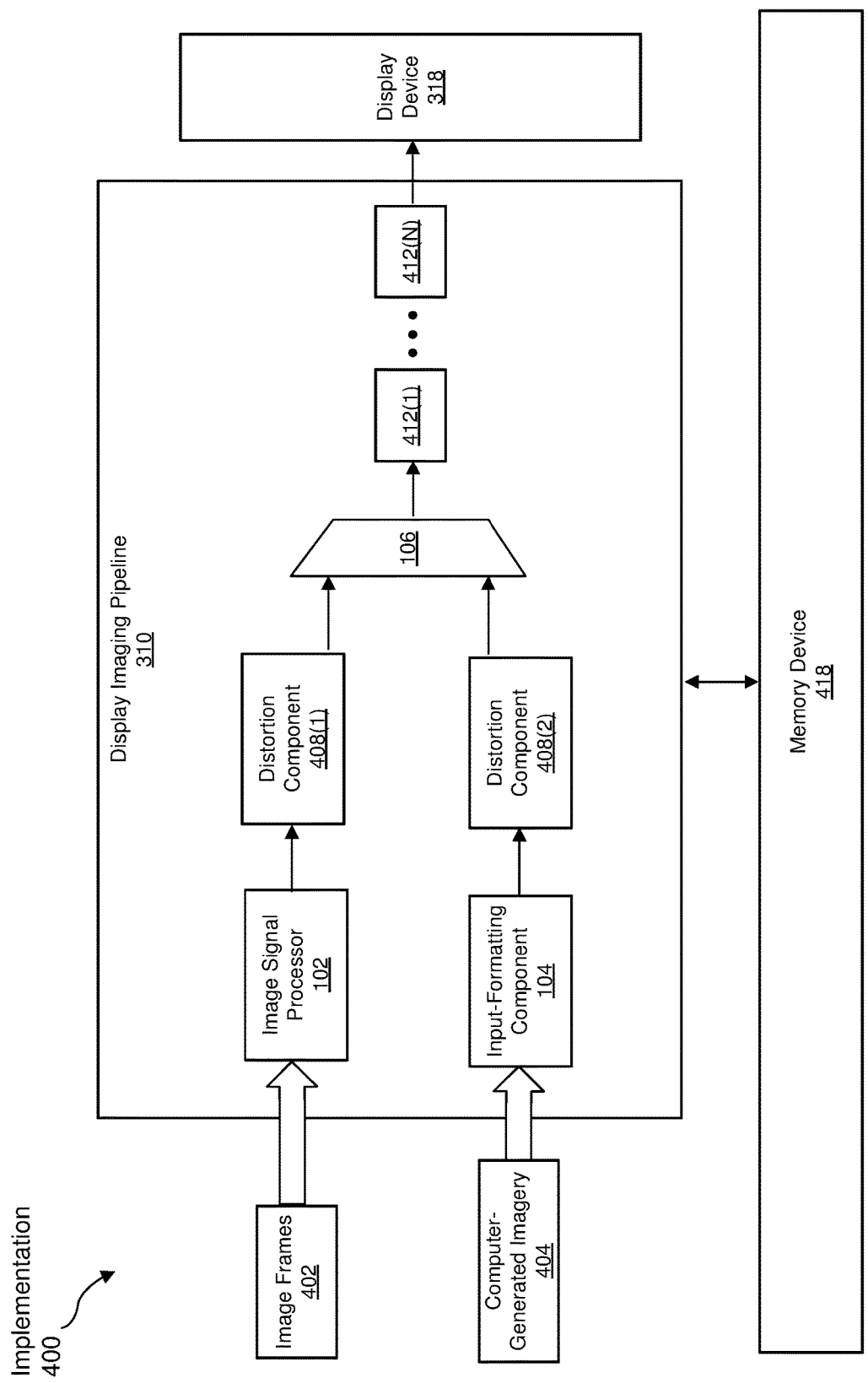
FIG. 4 is a block diagram of an exemplary implementation for mitigating motion-to-photon latency in head-mounted displays in accordance with some embodiments.

FIG. 4 illustrates an exemplary implementation 400 of display imaging pipeline 310 for mitigating motion-to-photon latency in head-mounted displays in accordance with some embodiments. As illustrated in FIG. 4, implementation 400 may include and/or involve display imaging pipeline 310, display device 318, and/or a memory device 418. Memory device 418 generally represents any type or form of volatile or non-volatile storage device or medium capable of storing data and/or computer-readable instructions. In one example, memory device 418 may include and/or represent a DRAM device and/or buffer. Additional examples of memory device 418 include, without limitation, Random Access Memory (RAM), Read Only Memory (ROM), flash memory, Solid-State Drives (SSDs), optical drives, caches, variations or combinations of one or more of the same, and/or any other suitable storage memory.

As illustrated in FIG. 4, display imaging pipeline 310 may include image signal processor 102, input-formatting component 104, distortion components 408(1) and 408(2), blending component 106, and/or hardware-accelerated image-correction components 412(1)-(N). In some examples, distortion components 408(1) and 408(2) may each represent an integrated device and/or circuit that performs certain distortion-correction operations (such as image distortion correction, asynchronous time warping, asynchronous space warping, etc.) on image frames and/or computer-generated imagery.

In some examples, hardware-accelerated image-correction components 412(1)-(N) may each represent an integrated device or circuit that performs one or more image processing operations. Examples of such image processing operations include, without limitation, chromatic aberration correction, gamma correction and/or adjustment, display overdrive compensation, Mura correction, dithering, image scaling, lens correction, noise correction, variations or combinations of one or more of the same, and/or any other suitable operations.

In some examples, implementation 400 may correspond to and/or represent a mixed-reality context. In one example, image frames 402 may arrive at image signal processor 102 within display imaging pipeline 310 on the way to display device 318. In this example, image frames 402 may have been captured by cameras 320(1)-(N) on head-mounted display 202.

As image frames 402 arrive, image signal processor 102 may perform certain image processing operations (such as lens correction, image scaling, noise correction, contrast adjustment, sharpness adjustment, color adjustment, etc.) on image frames 402 prior to forwarding the same to distortion component 408(1). Those image processing operations performed by image signal processor 102 may be applied to and/or intended exclusively for image frames 402. Accordingly, those image processing operations may not be applied to and/or intended for computer-generated imagery 404 with which image frames 402 are subsequently blended.

Upon receiving image frames 402, distortion component 408(1) may apply asynchronous time warping and/or asynchronous space warping to image frames 402. Distortion component 408(1) may then forward image frames 402 to blending component 106 for blending with computer-generated imagery 404.

The term "asynchronous time warping" may, in some examples, refer to an image processing operation in which an image frame is generated to represent and/or reflect a change in the user's head position based at least in part on previous frames and user-motion data. For example, asynchronous time warping may involve repurposing the last image frame by modifying that image frame to compensate and/or account for the user's head motion. This modification may effectively shift the image within the frame left, right, up, and/or down or even rotate the image within the frame clockwise and/or counterclockwise based on the user's head motion. Such asynchronous time warping may ensure that head-mounted display 202 always has an image frame to display even in the event that head-mounted display 202 was unable to prepare and/or render a completely new image frame within the required time period (due, e.g., to latency in the display imaging pipeline).

The term "asynchronous space warping" may, in some examples, refer to an image processing operation in which scenery and/or objects within an image frame are modified to compensate and/or account for a change in the user's head position based at least in part on differences identified in previous frames and user-motion data. For example, asynchronous space warping may involve modifying a previously rendered image frame by adjusting scenery and/or objects within the image frame in response to the user's movements. In one example, certain scenery and/or objects may be exposed and/or become visible within the image frame via asynchronous space warping after the user peers around a corner (whether real or virtual). Similarly, certain scenery and/or objects may be occluded within the image frame via asynchronous space warping after the user peers around the corner.

In this example, computer-generated imagery 404 may arrive at input-formatting component 104 within display imaging pipeline 310 on the way to display device 318. In this example, computer-generated imagery 404 may have been generated and/or provided by an independent host device that is external to and/or separate from head-mounted-display system 200.

As computer-generated imagery 404 arrives, input-formatting component 104 may perform certain image processing operations (such as decompression, decoding, scaling, edge preservation, etc.) on computer-generated imagery 404 prior to forwarding the same toward distortion component 408(2). Those image processing operations performed by input-formatting component 104 may be applied to and/or intended exclusively for computer-generated imagery 404. Accordingly, those image processing operations may not be applied to and/or intended for image frames 402 with which computer-generated imagery 404 is subsequently blended.

Upon receiving computer-generated imagery 404, distortion component 408(2) may apply asynchronous time warping and/or asynchronous space warping to computer-generated imagery 404. Distortion component 408(2) may then forward computer-generated imagery 404 to blending component 106 for blending with image frames 402.

In one example, distortion component 408(1) may distort image frames 402 to align certain pixels of image frames 402 to corresponding pixels of computer-generated imagery 404. Distortion component 408(1) may also map each of those pixels of image frames 402 to a specific display element of display device 318. Similarly, distortion component 408(2) may distort computer-generated imagery 404 to align the corresponding pixels of computer-generated imagery 404 to those pixels of the image frames 402. Distortion component 408(2) may also map each of the corresponding pixels of computer-generated imagery 404 to the specific element of display device 318.

In some examples, blending component 106 may receive image frames 402 and/or computer-generated imagery 404. In such examples, blending component 106 may generate mixed-reality frames by overlying computer-generated imagery 404 onto image frames 402. These mixed-reality frames may include a combination of real and virtual elements from image frames 402 and computer-generated imagery 404. Blending component 106 may then forward the mixed-reality frames to hardware-accelerated image-correction components 412(1)-(N) for the final stage of the frame processing cycle before presentation to the user at display device 318.

At hardware-accelerated image-correction components 412(1)-(N), the mixed-reality frames may undergo certain image processing operations that are intended for both image frames 402 and computer-generated imagery 404 after the blending stage. Upon completion of those image processing operations, hardware-accelerated image-correction components 412(1)-(N) may forward the mixed-reality frames to display device 318 for rendering and/or presentation to the user.

The description provided above in connection with FIG. 4 may represent an exemplary image frame processing cycle in which image frames 402 and computer-generated imagery 404 undergo pre-blending processing operations, are blended into mixed-reality frames, and then undergo further post-blending processing operations. Implementation 400 in FIG. 4 may enable display imaging pipeline 310 to optimize and/or minimize the number of memory accesses (e.g., read or write operations) made to memory device 418. For example, and as illustrated in FIG. 4, display imaging pipeline 310 may provide a direct path between image signal processor 102 and the subsequent component (in this example, distortion component 408(1)) in display imaging pipeline 310. This direct path may enable image signal processor 102 to forward image frames 402 directly to the subsequent component in display imaging pipeline 310 without first being buffered in memory device 418. Thus, this direct path may effectively eliminate the need to buffer image frames 402 in memory device 418 between image signal processor 102 and the subsequent component. By doing so, this direct path may reduce the number of DRAM accesses involved in the image frame processing cycle when compared to traditional GPU-driven embodiments.

Figure 5:
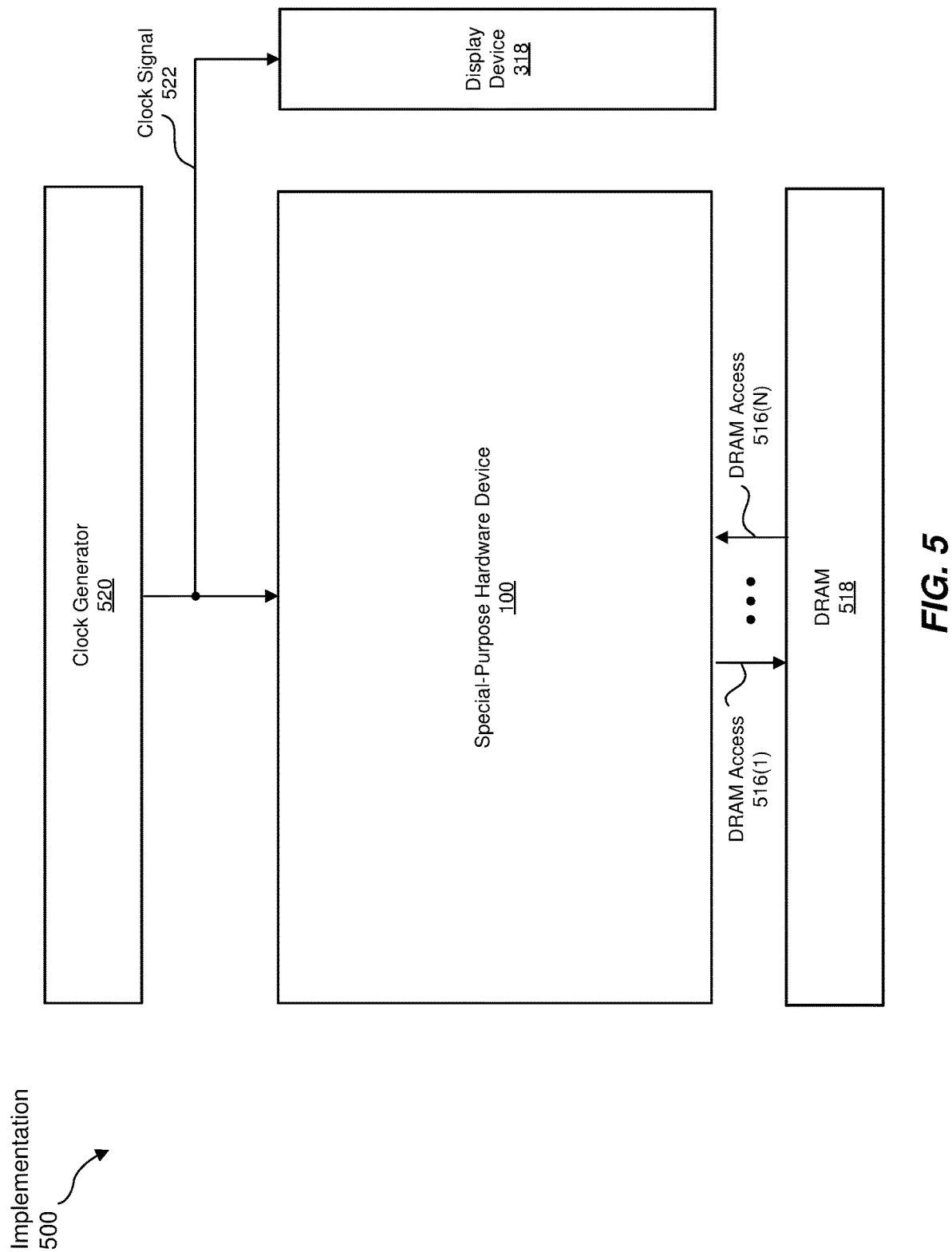
FIG. 5 is a block diagram of an exemplary implementation for mitigating motion-to-photon latency in head-mounted displays in accordance with some embodiments.

FIG. 5 illustrates an exemplary implementation 500 of special-purpose hardware device 100 for mitigating motion-to-photon latency in head-mounted displays in accordance with some embodiments. As illustrated in FIG. 5, implementation 500 may include and/or involve special-purpose hardware device 100, display device 318, DRAM 518, and a clock generator 520. Examples of clock generator 520 include, without limitation, resonators, oscillators, wave-generating circuits, Phase Locked Loops (PLLs), variations or combinations of one or more of the same, and/or any other suitable clock generator.

In one example, clock generator 520 may generate a clock signal 522 and/or feed the same to both special-purpose hardware device 100 and display device 318. In this example, clock signal 522 may serve to synchronize special-purpose hardware device 100 and display device 318 with respect to one another. In other words, special-purpose hardware device 100 and display device 318 may be synchronized to one another based at least in part on clock signal 522.

In some examples, special-purpose hardware device 100 in FIG. 5 may be designed specifically for performing time-sensitive image processing operations in virtual-reality, augmented-reality, and/or mixed-reality contexts. This design, as represented in implementation 500 in FIG. 5, may enable special-purpose hardware device 100 to optimize and/or minimize the number of DRAM accesses 516(1)-(N) made to DRAM 518. For example, special-purpose hardware device 100 may include one or more direct paths between internal components. These direct paths may carry image frames and/or computer-generated imagery directly from one image processing component to the next without first being buffered in DRAM 518. Thus, these direct paths may effectively eliminate the need to buffer image frames and/or computer-generated imagery in DRAM 518 between that image processing component and the next one as they traverse toward display device 318. By doing so, these direct paths may reduce the number of DRAM accesses involved in the image frame processing cycle when compared to the traditional GPU-driven embodiments.

As will be described in greater detail below, display imaging pipeline 310 implemented on special-purpose hardware device 100 may perform some or all of the image processing operations in-line to reduce the latency of the frame processing cycle. The term "in-line" may, in some examples and as used herein with respect to processing operations, generally refer to a progression or transition in which an image frame traverses from one hardware-accelerated component directly to another hardware-accelerated component without being intermittently buffered in memory. Such in-line processing may be unachievable and/or impractical in traditional GPU-driven embodiments due at least in part to the general-purpose architecture of the GPU and/or its heavy reliance on the DRAM buffer.

By performing these image processing operations in-line, display imaging pipeline 310 implemented on special-purpose hardware device 100 may be able to achieve further efficiency gains and/or processing precision unavailable to traditional GPU-driven embodiments. For example, a traditional GPU-driven display pipeline may be designed and/or programmed to perform image processing operations frame-by-frame. In this example, each image processing operation may be applied to an entire image frame, as opposed to individual lines of the image frame. Accordingly, the traditional GPU may be unable to apply certain image manipulation and/or correction measures to less than an entire image frame.

One reason for this deficiency in traditional GPU-driven embodiments is synchronization between the GPU and the display device. For example, the traditional GPU may need to feed and/or deliver image frames to the display device on a regular schedule to maintain visual continuity from the user's perspective. However, the traditional GPU and the display device may rely and/or operate on different clock signals relative to one another. To achieve the steady delivery of image frames from the GPU to the display device, the GPU and the display device may need to perform synchronization operations with respect to one another on a regular basis.

Unfortunately, like DRAM accesses, each synchronization operation may result in and/or amount to a delay or time penalty for the affected image frames (not to mention additional resource consumption). Thus, the amount of time needed to complete all the image processing operations on certain image frames may be prolonged and/or drawn out due at least in part to the ongoing synchronization requirements of the traditional GPU and the display device.

To provide visual continuity to the user even though the traditional GPU and the display device rely and/or operate on different clock signals, the traditional GPU may be somewhat limited to performing low granularity, inefficient image processing operations (such as frame-based operations) to ensure that the display device is fed a steady stream of image frames. In other words, this practice of low granularity image processing may help traditional GPU-driven embodiments avoid more serious display problems (such as underflow and/or overflow), which could potentially cause the display to drop certain frames.

However, display imaging pipeline 310 implemented on special-purpose hardware device 100 may obviate and/or mitigate the above-described synchronization problem. For example, special-purpose hardware device 100 may be designed to rely and/or operate on the same clock signal as display device 318. In this example, and as described above, head-mounted display 202 may include clock generator 520 that generates and/or produces clock signal 522. Clock generator 520 may pipe and/or feed clock signal 522 to both special-purpose hardware device 100 and display device 318.

By piping and/or feeding clock signal 522 to special-purpose hardware device 100 in this way, clock generator 520 may effectively enable the display imaging pipeline 310 and display device 318 to avoid becoming out-of-sync with respect to the image stream. This common clock generator may also enable the display imaging pipeline 310 implemented on special-purpose hardware device 100 and display device 318 to avoid time-consuming synchronization operations. As a result, display imaging pipeline 310 implemented on special-purpose hardware device 100 may be able to perform higher granularity, more efficient or dynamic image processing operations on the image stream without running the risk of underflow and/or overflow. For example, without the risk of underflow and/or overflow, display imaging pipeline 310 implemented on special-purpose hardware device 100 may be able to perform intraframe processing on the image stream. In other words, display imaging pipeline 310 implemented on special-purpose hardware device 100 may dynamically process image frames line-by-line, as opposed to merely frame-by-frame, without causing frame drops at display device 318.

Figure 6:
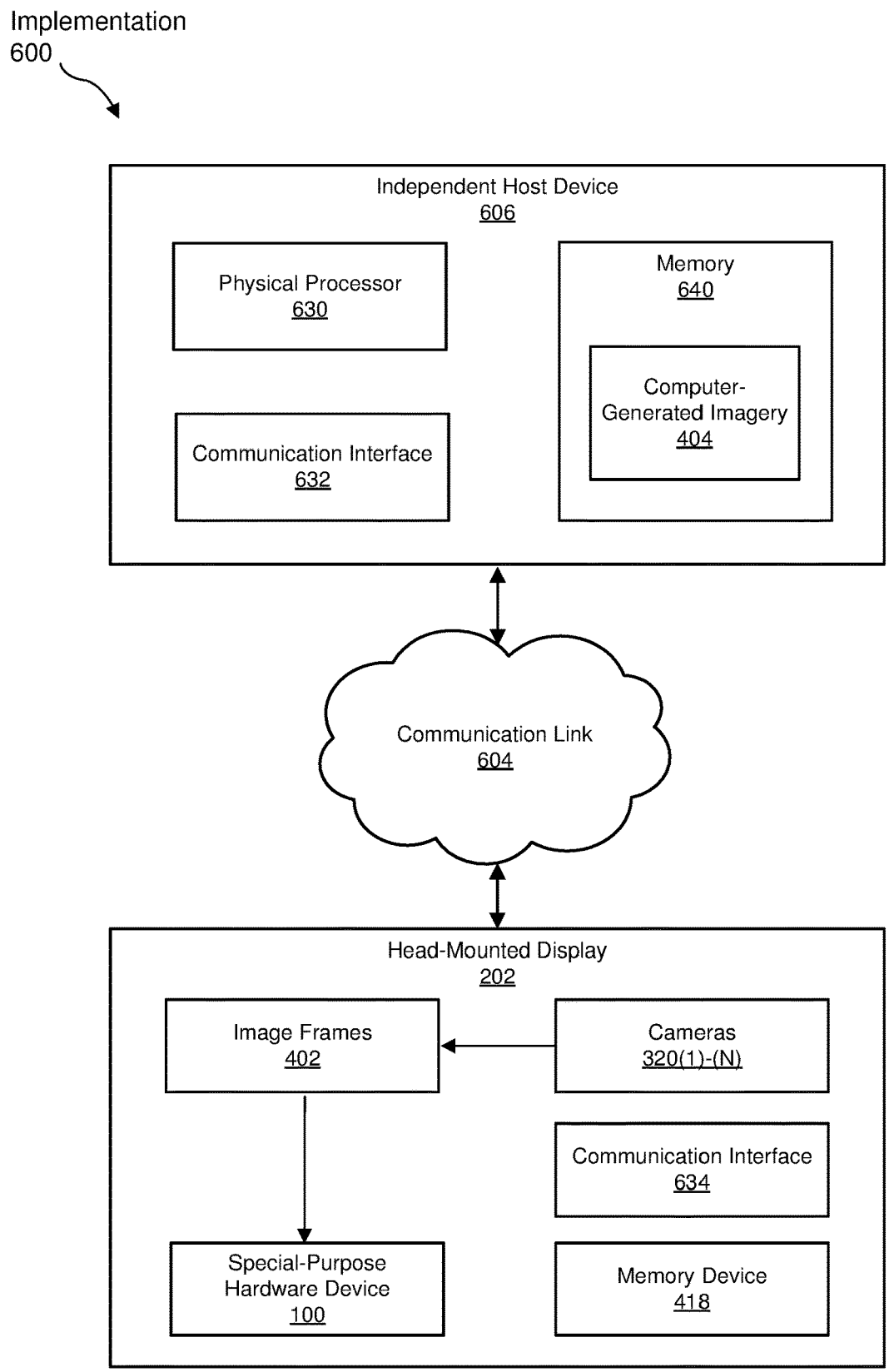
FIG. 6 is a block diagram of an exemplary implementation for mitigating motion-to-photon latency in head-mounted displays in accordance with some embodiments.

FIG. 6 illustrates an exemplary implementation 600 of special-purpose hardware device 100 for mitigating motion-to-photon latency in mixed-reality head-mounted displays in accordance with some embodiments. As illustrated in FIG. 6, implementation 600 may include and/or involve head-mounted display 202 and an independent host device 606 in communication with one another via a communication link 604. In one example, independent host device 606 may represent a Personal Computer (PC) and/or gaming console. In this example, independent host device 606 may include a physical processor 630, a communication interface 632, and memory 640.

As illustrated in FIG. 6, head-mounted display 202 may include special-purpose hardware device 100, cameras 320(1)-(N), a communication interface 634, and memory device 418. In one example, independent host device 606 and head-mounted display 202 may establish and/or form communication link 604 with one another by way of communication interfaces 632 and 634, respectively. In this example, cameras 320(1)-(N) on head-mounted display 202 may capture image frames 402 from the perspective of the user.

In one example, independent host device 606 may feed computer-generated imagery 404 to head-mounted display 202 via communication link 604 so that head-mounted display 202 is able to blend computer-generated imagery 404 with image frames 402 captured by the onboard cameras. The resulting experience may appear to the user as a mixture of reality and virtual reality. Accordingly, head-mounted display 202 may effectively serve as a see-through camera that enables the user to view his or her surroundings as modified by virtual objects fed from the independent host device 606.

As a specific use-case example, a user may wear and/or operate head-mounted display 202 in his or her living room. In this example, head-mounted display 202 may capture video of his or her surroundings (including, e.g., living room furniture) and then blend that video with virtual objects fed from a nearby PC. After completion of the corresponding processing and/or blending, the video displayed to the user within head-mounted display 202 may show and/or render a virtual cover (or so-called skin) over his or her couch in the living room, thereby manipulating the appearance of the couch from the user's perspective. In this example, special-purpose hardware device 100 may represent an ASIC that implements display imaging pipeline 310. Since, in this ASIC-implemented display pipeline, many of the time-sensitive image processing operations are performed by an ASIC rather than a GPU, the amount of time needed to complete all those operations may be reduced by designing the ASIC's hardware and/or architecture to minimize and/or optimize the number of DRAM accesses.

Figure 7:
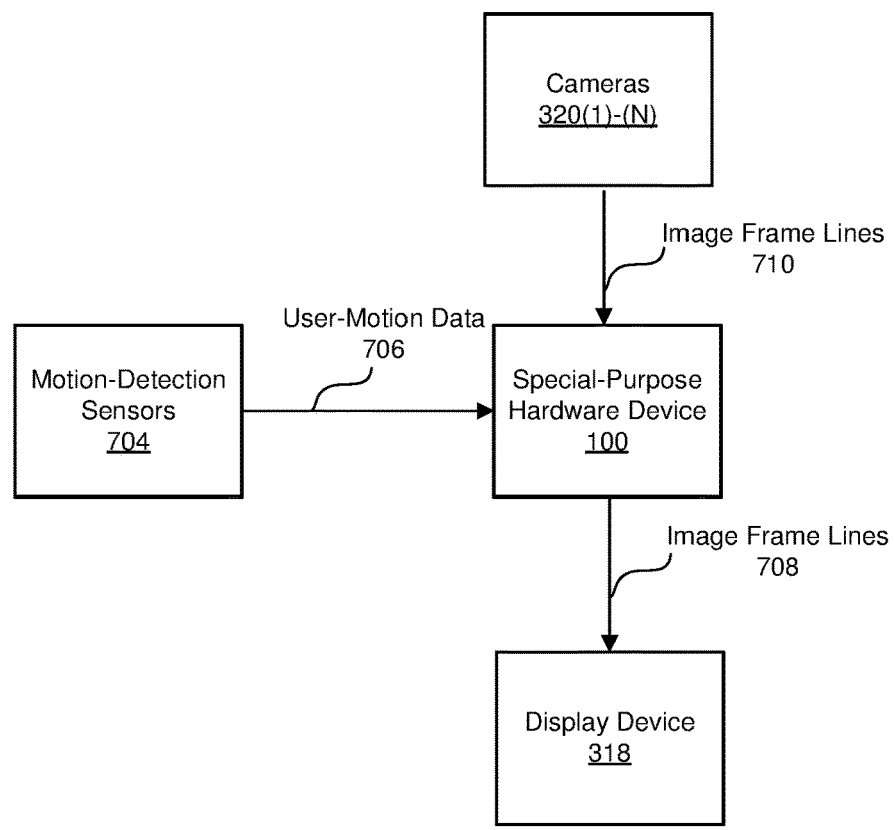
FIG. 7 is a block diagram of an exemplary implementation for mitigating motion-to-photon latency in head-mounted displays in accordance with some embodiments.

FIG. 7 illustrates exemplary components incorporated into head-mounted display 202 for mitigating motion-to-photon latency in accordance with some embodiments. As illustrated in FIG. 7, head-mounted display 202 may include and/or involve special-purpose hardware device 100, cameras 320(1)-(N), display device 318, and one or more motion-detection sensors 704. In some examples, motion-detection sensors 704 may detect and/or measure certain motions and/or movements made by the user wearing head-mounted display 202. Examples of motion-detection sensors 704 include, without limitation, gyroscopes, accelerometers, magnetometers, electronic compasses, combinations or variations of one or more of the same, and/or any other suitable motion-detection sensors.

In one example, motion-detection sensors 704 may generate user-motion data 706 in FIG. 7 while the user operates head-mounted display 202 and then send user-motion data 706 to special-purpose hardware device 100 to compensate and/or account for user-motion data 706 during the image frame processing cycle. In this example, user-motion data 706 may arrive at special-purpose hardware device 100 as some of the frame data from a single image frame is still being processed. User-motion data 706 may indicate and/or be used to determine that the user made one or more movements after that single image frame was captured by the onboard camera.

More specifically, user-motion data 706 may arrive at display imaging pipeline 310 after some individual lines of the frame have already been forwarded to display device 318 for presentation to the user. For example, a single frame may include and/or consist of image frame lines 708 (e.g., the top lines of the frame) and image frame lines 710 (e.g., the middle and/or bottom lines of the frame). In this example, user-motion data 706 may arrive at display imaging pipeline 310 after image frame lines 708 have been processed but before image frame lines 710 have been processed. In other words, image frame lines 708 may have already been processed by display imaging pipeline 310 and/or forwarded to or rendered by display device 318. As a result, display imaging pipeline 310 may be unable to compensate and/or account for the user's recent movements represented in user-motion data 706 in image frame lines 708. However, display imaging pipeline 310 may still be able to compensate and/or account for the user's recent movements in image frame lines 710, which are still being processed and/or have yet to be forwarded to display device 318.

Accordingly, because display imaging pipeline 310 is implemented on special-purpose hardware device 100 (as opposed to a general-purpose device), display imaging pipeline 310 may perform in-line, intraframe image processing on a single frame. This in-line, intraframe processing may enable display imaging pipeline 310 to dynamically update and/or manipulate individual lines of a single frame as that frame traverses from cameras 320(1)-(N) to display device 318 on head-mounted display 202. By doing so, display imaging pipeline 310 may compensate and/or account for the user's movements on certain lines of the frame even though such compensation is unavailable to other lines of the frame that have already been processed and/or forwarded to the display device for rendering.

Figure 8:
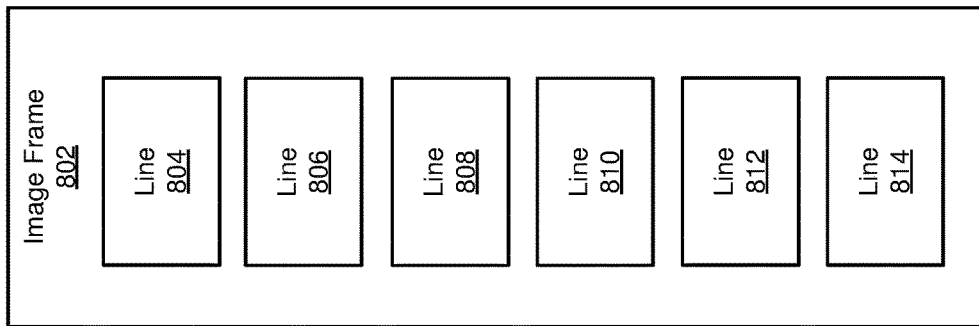
FIG. 8 is a block diagram of an exemplary image frame that undergoes in-line processing in a display imaging pipeline while traversing toward a display device in accordance with some embodiments.
Figure 9:
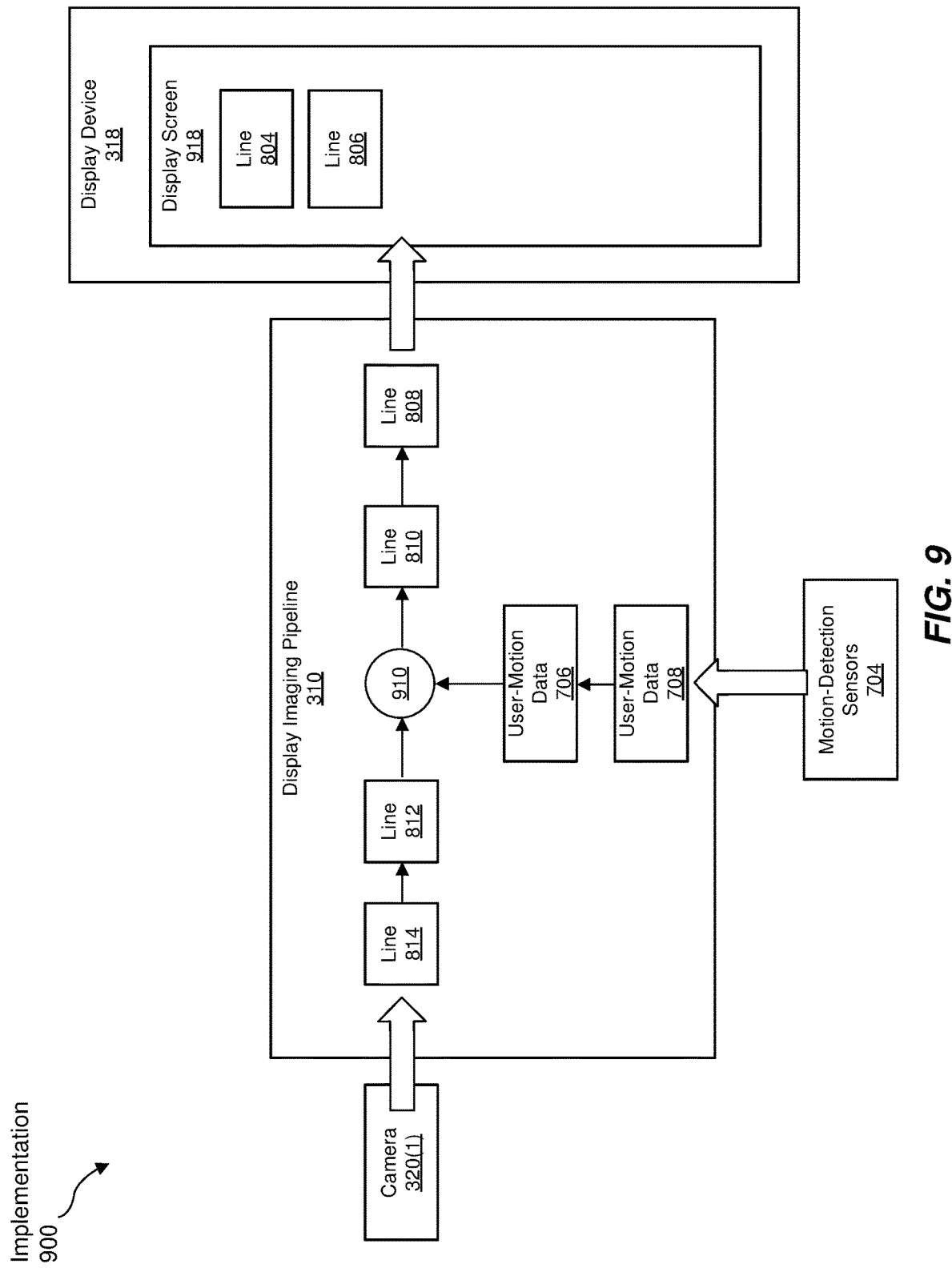
FIG. 9 is a block diagram of an exemplary implementation for performing in-line processing on an image frame traversing a display imaging pipeline toward a display device in accordance with some embodiments.

FIGS. 8 and 9 collectively illustrate an exemplary implementation 900 for mitigating motion-to-photon latency in head-mounted displays via hardware-accelerated intraframe processing in accordance with some embodiments. As illustrated in FIG. 8, a single image frame 802 may consist of various graphical lines, including lines 804, 806, 808, 810, 812, and 814 (collectively referred to herein as "lines 804-814"). In one example, lines 804-814 may each include graphical and/or image data or pixels. In this example, lines 804-814 may each include photographic data or pixels captured by cameras 320(1)-(N) and/or provided by a photographic file source stored locally on head-mounted display 202 and/or transmitted to head-mounted display 202 from a remote device (such as independent host device 606). Additionally or alternatively, lines 804-814 may each include virtual image data representative of virtual objects and/or elements (such as CGI) stored in a local image file source and/or provided by a remote device.

In one example, lines 804-814 may each correspond to and/or represent a discrete image frame line to be rendered by display device 318 of head-mounted display 202. For example, line 804 may correspond to and/or represent the top line of image frame 802 to be rendered by the topmost and/or highest display element(s) of display device 318 from the user's perspective. In this example, line 814 may correspond to and/or represent the bottom line of image frame 802 to be rendered by the bottommost and/or lowest display element(s) of display device 318 from the user's perspective.

As illustrated in FIG. 9, implementation 900 may include and/or involve display imaging pipeline 310, display device 318, camera 320(1), and/or motion-detection sensors 704. In implementation 900, image frame 802 may traverse display imaging pipeline 310 as a stream and/or sequence of individual lines. For example, camera 320(1) may capture image frame 802 at specific point in time and then feed image frame 802 into display imaging pipeline 310 in a line-by-line fashion. In this example, line 804 may be the first one to enter and exit display imaging pipeline 310, followed by line 806 and so on. Finally, line 814 may be the last one to enter and exit display imaging pipeline 310 on the way to display device 318. Accordingly, this particular sequence of individual lines may correspond to and/or represent a First In, First Out (FIFO) data delivery scheme.

In implementation 900, motion-detection sensors 704 may measure the user's motions and/or movements on a continual basis. As a result, motion-detection sensors 704 may be continually generating user-motion data representative of such motions and/or movements and/or sending the same to display imaging pipeline 310 to enable display imaging pipeline 310 to compensate and/or account for the user's motions and/or movements in the image frames captured by camera 320(1). For example, after the camera captures image frame 802, the user may make a sudden motion and/or movement with his or her head. In this example, motion-detection sensors 704 may detect and/or measure this motion and/or movement made by the user. Motion-detection sensors 704 may then generate user-motion data based at least in part on this motion and/or movement.

In one example, motion-detection sensors 704 may generate user-motion data 706 that reflects the user's motion and/or current position or orientation at a certain point in time. In this example, motion-detection sensors 704 may subsequently generate user-motion data 706 that reflects the user's motion and/or current position or orientation at a subsequent point in time.

In some examples, motion-detection sensors 704 may feed the user-motion data to display imaging pipeline 310 so that display imaging pipeline 310 is able to modify at least a portion of image frame 802 to reflect the user's ongoing motions and/or movements. For example, user-motion data 706 may become available to display imaging pipeline 310 only after (1) lines 804 and 806 have already been processed by display imaging pipeline 310 and rendered on a display screen 918 of display device 318 and (2) lines 808 and 810 have already been processed by display imaging pipeline 310 and are on their way to display device 318. As a result, each of lines 804, 806, 808, and 810 may no longer be eligible for any sort of modification based on user-motion data 706. However, even though lines 804, 806, 808, and 810 are no longer eligible for such modification, lines 812 and 814 may still be eligible for modification based at least in part on user-motion data 706.

In one example, as user-motion data 706 arrives from motion-detection sensors 704, display imaging pipeline 310 may perform at least one image processing operation 910 that applies user-motion data 706 to line 812. In this example, image processing operation 910 may compensate and/or account for the user's recent motion and/or current position or orientation based at least in part on user-motion data 706. For example, image processing operation 910 may include and/or involve asynchronous time warping and/or asynchronous space warping. After completion of image processing operation 910, display imaging pipeline 310 may feed the modified version of line 812 to display device 318 for rendering on display screen 918.

Similarly, user-motion data 706 may become available to display imaging pipeline 310 only after each of lines 804, 806, 808, 810, and 812 have already been processed by display imaging pipeline 310 and/or rendered on a display screen 918 of display device 318. As a result, each of lines 804, 806, 808, 810, and 812 may no longer be eligible for any sort of modification based on user-motion data 706. However, even though lines 804, 806, 808, 810, and 812 are no longer eligible for such modification, line 814 may still be eligible for modification based at least in part on user-motion data 706.

In this example, as user-motion data 706 arrives from motion-detection sensors 704, display imaging pipeline 310 may perform at least one image processing operation that applies user-motion data 706 to line 814. This image processing operation may compensate and/or account for the user's recent motion and/or current position or orientation based at least in part on user-motion data 706. After completion of this image processing operation, display imaging pipeline 310 may feed the modified version of line 814 to display device 318 for rendering on display screen 918.

As a result of this line-by-line processing by display imaging pipeline 310, each line of the frame rendered by display device 318 may effectively correspond to and/or represent a different, discrete point in time relative to the user's movement and/or head position or orientation. Thus, display imaging pipeline 310 may enable head-mounted display 202 to achieve high frame rate rendering of the image stream with minimal motion-to-photon latency. Display imaging pipeline 310 implemented on special-purpose hardware device 100 may even push and/or advance such head-mounted display technology toward zero motion-to-photon latency.

Figure 10:
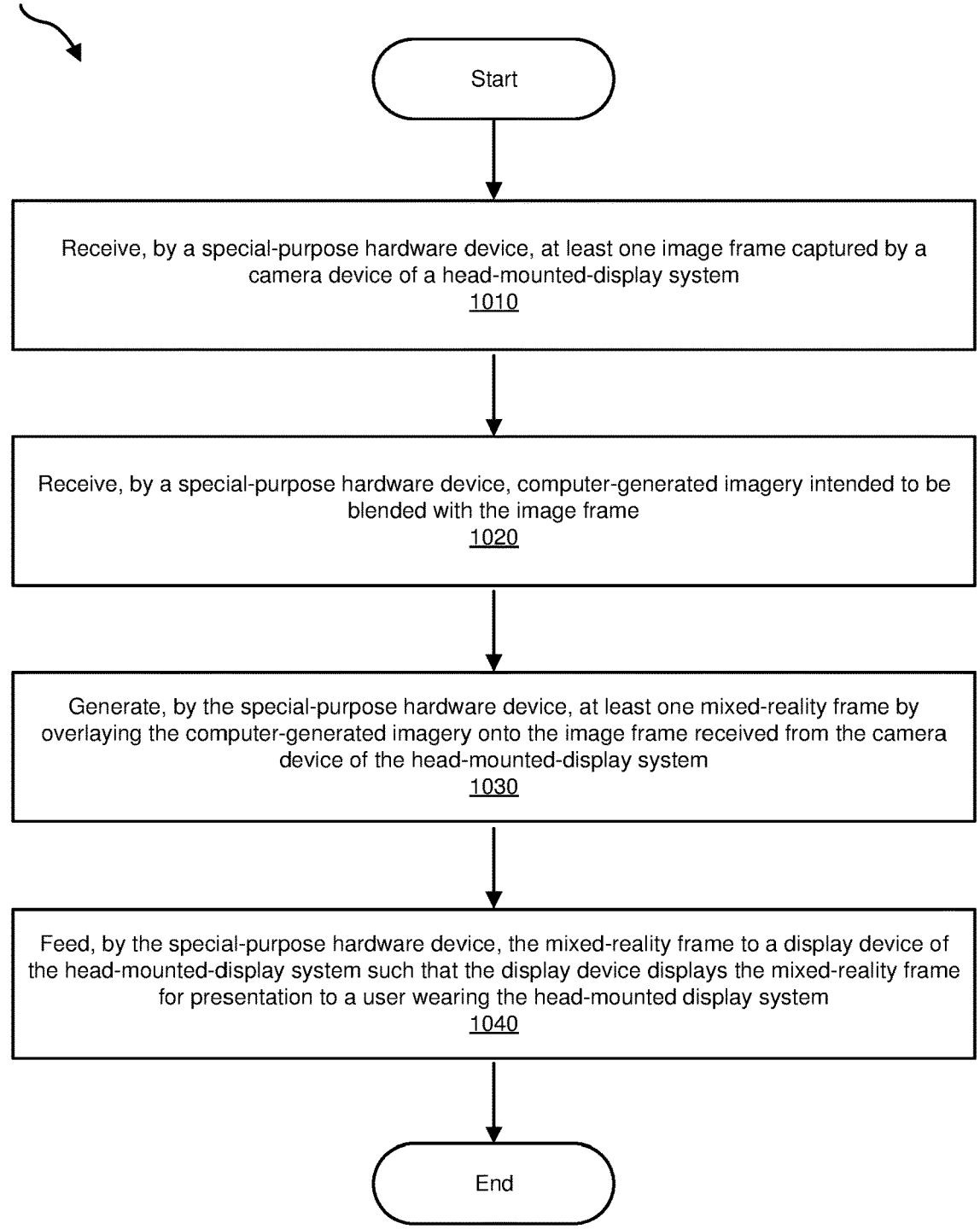
FIG. 10 is a flow diagram of an exemplary method for mitigating motion-to-photon latency in head-mounted displays in accordance with some embodiments.

FIG. 10 is a flow diagram of an exemplary method 1000 for mitigating motion-to-photon latency in head-mounted displays according to any of the embodiments disclosed herein. The steps shown in FIG. 10 may be performed by a special-purpose hardware device (such as an ASIC or SoC) incorporated into a head-mounted display. Moreover, the steps shown in FIG. 10 may also incorporate and/or involve various sub-steps and/or variations consistent with the descriptions described above in connection with FIGS. 1-9.

As illustrated in FIG. 10, at step 1010, a special-purpose hardware device may receive at least one image frame captured by a camera device of a head-mounted-display system. For example, cameras 320(1)-(N) may capture image frames 402 and then forward the same to special-purpose hardware device 100. As image frames 402 arrive, special-purpose hardware device 100 may receive image frames 402 for processing in preparation for display to user 204.

At step 1020 in FIG. 10, the special-purpose hardware device may receive computer-generated imagery intended to be blended with the image frame. For example, independent host device 606 may transmit computer-generated imagery 404 to head-mounted display 202 via communication link 604. Additionally or alternatively, a source device internal to head-mounted display 202 may forward computer-generated imagery 404 to special-purpose hardware device 100. As computer-generated imagery 404 arrives, special-purpose hardware device 100 may receive computer-generated imagery 404 for processing in preparation for display to user 204.

At step 1030 in FIG. 10, the special-purpose hardware device may generate at least one mixed-reality frame by overlaying the computer-generated imagery onto the image frame. For example, special-purpose hardware device 100 may blend computer-generated imagery 404 with image frames 402. In this example, special-purpose hardware device 100 may generate mixed-reality frames by overlaying at least some of computer-generated imagery 404 onto image frames 402.

At step 1040 in FIG. 10, the special-purpose hardware device may feed the mixed-reality frame to a display device of the head-mounted-display system such that the display device displays the mixed-reality frame for presentation to a user wearing the head-mounted-display system. For example, special-purpose hardware device 100 may pass and/or forward the mixed-reality frame to display device 318 of head-mounted display 202. Upon receiving the mixed-reality frame, display device 318 may display the mixed-reality frame for presentation to user 204.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A special-purpose hardware device comprising:
   an image signal processor that receives at least one image frame captured by a camera device of a head-mounted-display system;
   an input-formatting component that receives computer-generated imagery intended to be blended with the image frame;
   a blending component communicatively coupled to the image signal processor and the input-formatting component, wherein the blending component generates at least one mixed-reality frame by overlaying the computer-generated imagery onto the image frame received from the camera device of the head-mounted-display system;
   a hardware-accelerated image-correction component that performs at least one image-correction procedure on the mixed-reality frame to prepare the mixed-reality frame to be displayed to a user of the head-mounted display system; and
   a frame-output interface communicatively coupled to the hardware-accelerated image-correction component, wherein the frame-output interface feeds the mixed-reality frame processed by the hardware-accelerated image-correction component to a display device of the head-mounted-display system to facilitate displaying the mixed-reality frame for presentation to the user wearing the head-mounted-display system.

2. The special-purpose hardware device of claim 1, wherein the hardware-accelerated image-correction components comprise a hardware-accelerated device that at least partially corrects a chromatic aberration in the mixed-reality frame as the mixed-reality frame traverses toward the display device.

3. The special-purpose hardware device of claim 1, wherein the hardware-accelerated image-correction components comprise a hardware-accelerated device that performs gamma correction on the mixed-reality frame as the mixed-reality frame traverses toward the display device.

4. The special-purpose hardware device of claim 1, wherein the hardware-accelerated image-correction components comprise a hardware-accelerated device that performs non-uniformity correction on the mixed-reality frame as the mixed-reality frame traverses toward the display device.

5. The special-purpose hardware device of claim 1, wherein the hardware-accelerated image-correction components comprise a hardware-accelerated device that modifies the mixed-reality frame to account for an overdrive feature of the display device as the mixed-reality frame traverses toward the display device.

6. The special-purpose hardware device of claim 1, wherein the hardware-accelerated image-correction components comprise a hardware-accelerated device that at least partially corrects a Mura phenomenon in the mixed-reality frame as the mixed-reality frame traverses toward the display device.

7. The special-purpose hardware device of claim 1, wherein the hardware-accelerated image-correction components comprise a hardware-accelerated device that performs dithering on the mixed-reality frame as the mixed-reality frame traverses toward the display device.

8. The special-purpose hardware device of claim 1, further comprising a direct communication path between the image signal processor and the blending component that enables the image frame to be fed directly to the blending component without being buffered in memory.

9. The special-purpose hardware device of claim 1, further comprising a hardware-accelerated distortion component that applies asynchronous time warping to the image frame before the computer-generated imagery is overlaid onto the image frame.

10. The special-purpose hardware device of claim 9, further comprising an additional hardware-accelerated distortion component that applies asynchronous time warping or asynchronous space warping to the computer-generated imagery before the computer-generated imagery is overlaid onto the image frame.

11. The special-purpose hardware device of claim 10, wherein:
    the hardware-accelerated distortion component distorts the image frame to:
        align certain pixels of the image frame to corresponding pixels of the computer-generated imagery; and
        map the certain pixels of the image frame to a specific element of the display device; and
    the additional hardware-accelerated distortion component distorts the computer-generated imagery to:
        align the corresponding pixels of the computer-generated imagery to the certain pixels of the image frame; and
        map the corresponding pixels of the computer-generated imagery to the specific element of the display device.

12. The special-purpose hardware device of claim 1, wherein the image signal processor:
    forwards the image frame directly to a processing component within the special-purpose hardware device without temporarily buffering the image frame in memory; and
    mitigates motion-to-photon latency of the head-mounted-display system by avoiding accessing memory in connection with the image frame.

13. The special-purpose hardware device of claim 12, wherein the processing component within the special-purpose hardware device comprises at least one of:
    the blending component; and
    a hardware-accelerated distortion component that applies asynchronous time warping to the image frame before the computer-generated imagery is overlaid onto the image frame.

14. A head-mounted-display system comprising:
    at least one camera device that captures one or more image frames from a perspective of a user wearing the head-mounted-display system;
    a special-purpose hardware device communicatively coupled to the camera device, wherein the special-purpose hardware device:
        receives the image frames from the camera device;
        receives computer-generated imagery intended to be blended with the image frames;

generates one or more mixed-reality frames by overlaying the computer-generated imagery onto the image frames received from the camera device; and performs at least one image-correction procedure on the mixed-reality frame to prepare the mixed-reality frame to be displayed to the user wearing the head-mounted-display system; and a display device communicatively coupled to the special-purpose hardware device, wherein the display device:
receives the mixed-reality frames from the special-purpose hardware device; and
displays the mixed-reality frames for presentation to the user wearing the head-mounted-display system.

15. The head-mounted-display system of claim 14, further comprising a clock generator that generates a clock signal; and
wherein the special-purpose hardware device and the display device are synchronized with respect to one another based at least in part on the clock signal generated by the clock generator.

16. The head-mounted-display system of claim 14, wherein the special-purpose hardware device performs one or more hardware-accelerated intraframe processing operations on the image frames on a line-by-line basis.

17. The head-mounted-display system of claim 14, further comprising a motion-detection sensor that detects movements made by the user wearing the head-mounted-display system;
wherein the special-purpose hardware device:
receives, from the motion-detection sensor, user-motion data indicating that the user wearing the head-mounted-display system has made at least one movement since a certain image frame was captured by the camera device;
identifies a subset of lines from the certain image frame that have yet to be forwarded toward the display device even though an additional subset of lines from the certain image frame have already been forwarded toward the display device;
modifies the subset of lines from the certain image frame based at least in part on the user-motion data from the motion-detection sensor to compensate for the movement made by the user; and
forwards the subset of modified lines from the certain image frame toward the display device to facilitate displaying, for presentation to the user, the subset of modified lines together with the additional subset of lines.

18. The special-purpose hardware device of claim 17, wherein:
the additional subset of lines from the certain image frame have not been modified to compensate for the movement made by the user; and
the display device simultaneously displays, during at least one point in time, the subset of modified lines and the additional subset of lines for presentation to the user.

19. A method comprising:
receiving, by a special-purpose hardware device, at least one image frame captured by a camera device of a head-mounted-display system;
receiving, by the special-purpose hardware device, computer-generated imagery intended to be blended with the image frame;
generating, by the special-purpose hardware device, at least one mixed-reality frame by overlaying the computer-generated imagery onto the image frame received from the camera device of the head-mounted-display system;
performing, by the special-purpose hardware device, at least one image-correction procedure on the mixed-reality frame to prepare the mixed-reality frame to be displayed to a user wearing the head-mounted-display system; and
feeding, by the special-purpose hardware device, the mixed-reality frame to a display device of the head-mounted-display system such that the display device displays the mixed-reality frame for presentation to the user wearing the head-mounted-display system.

* * * * *